Figure 1:
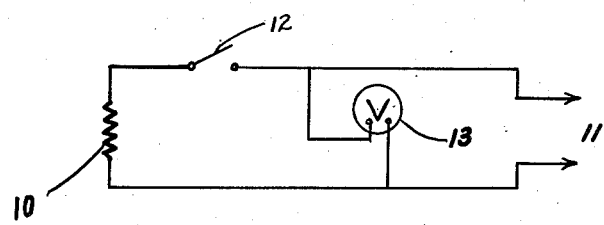

June 5, 1951   J. F. ATKINSON   2,555,306
WIRING ANALYZER

Filed Dec. 9, 1947   2 Sheets-Sheet 1

JOHN F. ATKINSON
INVENTOR.

BY Arthur G. Connolly
his Attorney

June 5, 1951    J. F. ATKINSON    2,555,306
WIRING ANALYZER

Filed Dec. 9, 1947    2 Sheets-Sheet 2

JOHN F. ATKINSON
INVENTOR.

Patented June 5, 1951

2,555,306

UNITED STATES PATENT OFFICE 2,555,306

WIRING ANALYZER

John F. Atkinson, Arlington, Va., assignor, by mesne assignments, to Sprague Electric Company, North Adams, Mass., a corporation of Massachusetts Application December 9, 1947, Serial No. 790,541

4 Claims. (Cl. 175—183)

This invention relates to novel electrical instruments and more particularly refers to instruments especially adapted for measuring the adequacy of electric wiring circuits.

In the field of electrical instrumentation there has long been a need for a simple, compact, readily portable, low-cost device that can be used for quickly determining the relative adequacy of electrical wiring circuits such as house wiring circuits, industrial lighting and power circuits, farm wiring circuits, service entrance circuits, transmission circuits and distribution circuits.

It is an object of this invention to design an instrument which performs the function of indicating directly the relative adequacy of electrical wiring in the above and related type circuits. A further object is to produce a simple instrument for measuring the voltage drop and efficiency of electrical wiring under load conditions. Additional objects will become apparent from the following description and claims.

These objects are attained in accordance with the present invention which is concerned with an instrument comprising a voltmeter with scale calibration in terms of percent voltage drop, and means for adjusting the voltmeter to the zero setting on the percent voltage drop scale under no-load conditions.

In a more restricted sense this invention is concerned with an electrical instrument comprising a series parallel circuit including a voltmeter with scale calibration in terms of percent voltage drop and a variable resistor in series therewith, said voltmeter and said resistor being in parallel with a switch and a test load device.

In one of its limited embodiments this invention is concerned with an instrument for measuring the relative adequacy of an electric wiring circuit, comprising a voltmeter circuit consisting of a voltmeter with scale calibrations in terms of percent voltage drop, means for adjusting the voltmeter to the zero setting on the percent voltage drop scale, and in parallel therewith a series circuit containing a load impedance and a load relay with a load relay switch.

In one of its preferred embodiments this invention is directed to an instrument for measuring the relative adequacy of an electric wiring circuit comprising a voltmeter circuit in parallel with a load circuit, said voltmeter circuit comprising a voltmeter with scale calibrations in terms of a voltage and in terms of percent voltage drop, a variable resistor for adjusting the voltmeter to the zero setting on the percent voltage drop scale, fixed impedances, a scale selector switch, and a load circuit comprising a load relay with a load relay switch and a load impedance.

This invention will be described with particular reference to the appended drawings in which Figure 1 is a simple schematic electrical circuit used in illustrating the principle of operation.

Figure 2:
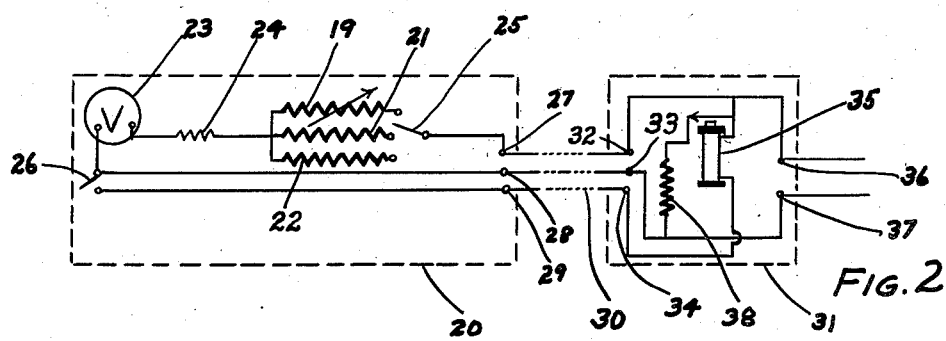
Figure 3:
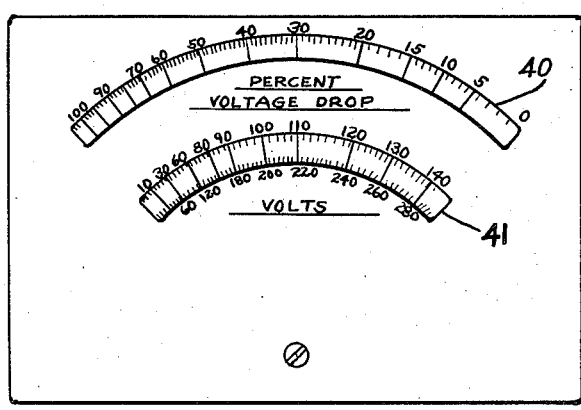
Figure 4:
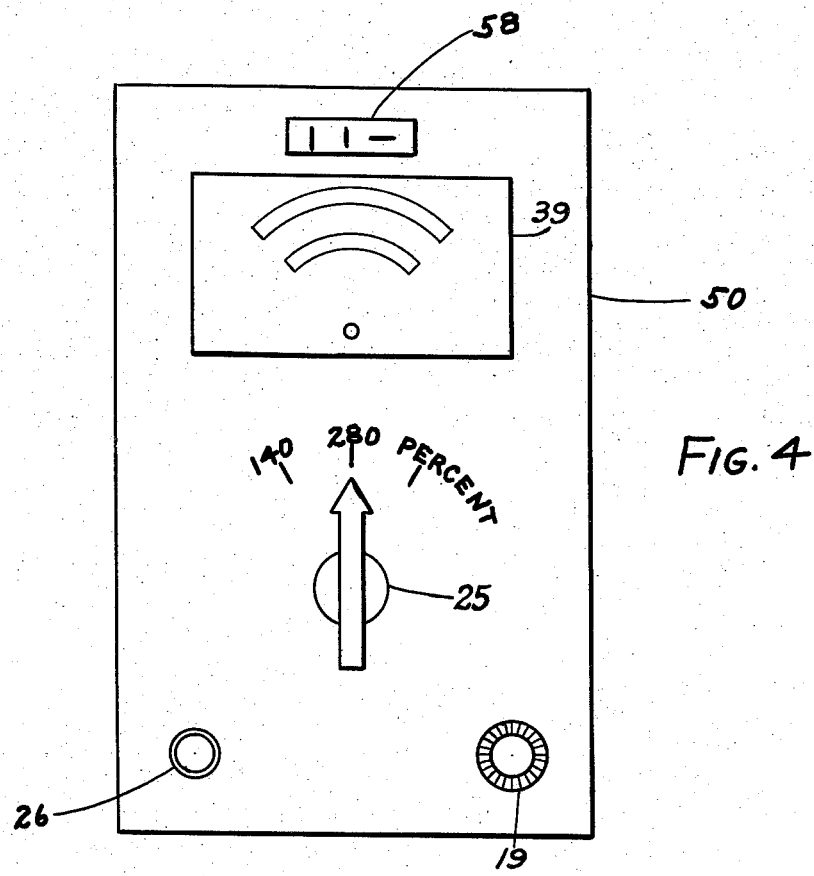

Figure 2 is a schematic electrical circuit of one embodiment of my invention showing a meter box and a load box, Figure 3 shows a meter scale arrangement, and Figure 4 is a top view of my meter box.

Referring more specifically to Figure 1, 10 represents a load impedance, such as a wire wound resistor, electric iron, toaster or other power consuming load. 11 represents a source of power, such as may be obtained at an outlet in a domestic wire circuit. 12 represents a switch or contactor which permits the voltage across the line to be determined on voltmeter 13, with switch 12 either closed or open. If suitable load impedance 10 is connected to the outlet 11 by means of switch 12, the resulting IR drop in the circuit will result in a lower voltage, usually designated as the load voltage. The difference between the no-load voltage and the load voltage is essentially the IR drop of the supply circuit attributable to the load 10. This IR drop may be used as an indicator of the circuit adequacy, for example, the smaller the IR drop the more adequate the circuit. This IR drop may be conveniently expressed in terms of percent voltage drop by the formula Per cent voltage drop =

$$\frac{\text{"no-load" voltage minus "load" voltage} \times 100}{\text{"no-load" voltage}}$$

In accordance with my invention a voltmeter may be modified so that it will measure or indicate percent voltage drop by incorporating a variable series resistor, or a variable shunt resistor, in the voltmeter circuit so that the variable resistor may be adjusted to give full-scale deflection on the voltmeter for the no-load condition of the circuit to be measured. Then by proper calibration of the voltmeter scale in terms of percent voltage drop, the percent voltage drop may be read directly when the load is applied to the metered circuit.

By incorporating and combining the principles described above into a suitable, easily operable, direct reading, compact and portable instrument, the object of this invention is achieved.

Figure 2 represents a schematic electrical diagram of such an instrument. It consists essentially of two units, a meter box 20 and a load box 31. The meter box circuit contains voltmeter 23 with the usual voltmeter multiplier resistor 24 in series with an impedance 19, 21, or 22, the particular impedance being determined by the position of selector switch 25. Impedance 19 consists of a variable resistor by which it is possible to adjust the voltmeter to read full scale under no-load conditions. Impedances 21 and 22, generally wire wound resistors, are used to permit the voltmeter to be read directly in volts under two ranges such as zero to 140 volts, and zero to 280 volts.

Terminals 27 and 28 connect the voltmeter circuit to the load box cable 30 under no-load conditions. Switch 26 is connected to one side of the voltmeter circuit and to terminal 29 which is connected to cable 30 leading to load box 31 providing electrical connection for load readings.

Load box 31 contains the three output terminals 32, 33, and 34 which are connected by means of cable 30 to terminals 27, 28 and 29, respectively, of meter box 20. The input for the load box is connected to terminals 36 and 37. Under no-load conditions the circuit runs from input terminal 36 to output terminal 32, through meter box 20, back to terminal 33 of load box 31 and then to terminal 37 thereof. Thus under no-load conditions a simple series circuit consisting of a voltmeter and a meter adjusting impedance exists.

Load box 31 is provided with relay 35 and load impedance 38. Load 38 is incorporated in the circuit, in parallel with voltmeter 23 by the action of relay 35, which in turn is actuated by current flow when switch 26 in meter box 20 is closed. Thus under load conditions, the series voltmeter circuit referred to previously is in parallel with load 38.

Figure 3 represents one embodiment of a scale face. Since most readings will fall near the right-hand end of the scale, an expanded scale meter movement is desirable. The percent voltage drop scale 40 and the volts scale 41 of meter face 39 are correlated in accordance with the formula:

Per cent voltage drop =

$$\frac{\text{Full scale reading on volts scale minus } 5 \times 100}{\text{Full scale reading on volts scale}}$$

where V = Voltage markings on volts scale.

| Volts scale marking | Per cent Voltage Drop |
|---|---|
| 140 (full scale) | 0 |
| 70 | 50 |
| 0 | 100 |

Figure 4 represents a top view of a meter box of the invention wherein parts already shown in Figures 2 and 3 are similarly numbered. 50 represents the meter box with meter face 39 mounted therein. Switch 25 selects the scale of reading to be used on the meter. When load readings are to be made, switch 26 is closed. This switch is generally a push button type with snap arrangement if so desired. When percent voltage drop readings are to be made, zero adjustment is made with resistor 19, with the load not in circuit. The connection terminals for the cable leading to the load box are shown at 58.

Many combinations of the above described instrument are readily apparent. For example, such an instrument may serve not only as a percent voltage drop indicator and as a voltmeter, but also, by use of suitable current transformers or current shunts and, of course, appropriate switching means, may also be used as an ammeter. Further this instrument may be used to indicate percent voltage drop on loads other than the load in the load box. The value of the load in the load box is generally fixed in order that the meter may be calibrated for a single set of conditions, but other types of loads or plug-in loads may be employed without changing the calibration of the scale.

As many apparently widely different embodiments of this invention may be made without departing from the spirit and scope hereof, it is to be understood that the invention is not limited to the specific embodiments hereof except as defined in the appended claims.

I claim:

1. An instrument for measuring the relative adequacy of an electric wiring circuit comprising a voltmeter circuit in parallel with a load circuit, said voltmeter circuit including a voltmeter with scale calibrations in terms of voltage and in terms of percent voltage drop, a variable resistor for adjusting the voltmeter to the zero setting on the percent voltage drop scale, fixed impedances and a scale selector switch, said switch connecting said variable resistor or one of said fixed impedances in series with said voltmeter, and said load circuit comprising in series a fixed load impedance and a relay actuated switch.

2. An instrument for measuring the relative adequacy of an electric wiring circuit comprising a voltmeter calibrated in terms of percent voltage drop, variable resistance means in series therewith to adjust the voltmeter to zero percent voltage drop under no load conditions, said voltmeter and said resistance means being connected in parallel with a series connected switch and fixed load impedance.

3. An instrument for measuring the relative adequacy of an electric wiring circuit comprising a voltmeter calibrated in terms of percent voltage drop, means for adjusting the voltmeter under no load conditions to the zero setting on the percent voltage drop scale consisting of a variable resistor in series with said voltmeter, said voltmeter and said adjusting means being connected in parallel with a test load circuit consisting of a test load impedance in series with a relay actuated switch.

4. The instrument of claim 3, wherein the switch is actuated by the closing of a mechanical switch connected in series with the relay coil across the two wire circuit.

JOHN F. ATKINSON.

REFERENCES CITED

The following references are of record in the file of this patent:

UNITED STATES PATENTS

| Number | Name | Date |
|---|---|---|
| 1,397,641 | Kolff | Nov. 22, 1921 |
| 2,270,554 | Pugh | Jan. 20, 1942 |
| 2,295,578 | Heyer | Sept. 15, 1942 |